(12) United States Patent
Wright et al.

(10) Patent No.: US 12,100,172 B2
(45) Date of Patent: Sep. 24, 2024

(54) METHOD AND APPARATUS FOR DEPTH ESTIMATION RELATIVE TO A MOBILE TERMINAL

(71) Applicant: Nokia Technologies Oy, Espoo (FI)

(72) Inventors: Christopher Wright, London (GB); Harry Cronin, Cambridge (GB); Phil Catton, Cambridge (GB)

(73) Assignee: Nokia Technologies Oy, Espoo (FI)

(*) Notice: Subject to any disclaimer, the term of this patent is extended or adjusted under 35 U.S.C. 154(b) by 358 days.

(21) Appl. No.: 17/671,631

(22) Filed: Feb. 15, 2022

(65) Prior Publication Data
US 2022/0270275 A1 Aug. 25, 2022

(30) Foreign Application Priority Data

Feb. 22, 2021 (GB) .................. 2102451

(51) Int. Cl.
| | |
|---|---|
| *G06T 7/00* | (2017.01) |
| *G01B 11/22* | (2006.01) |
| *G01B 11/26* | (2006.01) |
| *G06F 3/01* | (2006.01) |
| *G06T 7/55* | (2017.01) |
| *G06T 7/70* | (2017.01) |

(52) U.S. Cl.
CPC ............... *G06T 7/55* (2017.01); *G01B 11/22* (2013.01); *G01B 11/26* (2013.01); *G06F 3/013* (2013.01); *G06T 7/70* (2017.01)

(58) Field of Classification Search
CPC ... G06T 7/55; G06T 7/70; G06T 2207/10004; G06T 2207/30201; G01B 11/22; G01B 11/26; G06F 3/013; G06F 3/011
See application file for complete search history.

(56) References Cited

U.S. PATENT DOCUMENTS

| | | | |
|---|---|---|---|
| 10,257,495 B1 | 4/2019 | Poder et al. | |
| 2013/0342569 A1* | 12/2013 | Karkkainen | G06F 3/1423 345/633 |

(Continued)

OTHER PUBLICATIONS

"Google AI's Iris Software Tracks Eye Movement and Distance", Interesting Engineering, Retrieved on Feb. 24, 2022, Webpage available at : https://interestingengineering.com/google-ais-iris-software-tracks-eye-movement-and-distance.

(Continued)

*Primary Examiner* — Van D Huynh
(74) *Attorney, Agent, or Firm* — Nokia Technologies Oy (57) ABSTRACT

The method, apparatus and computer program product estimate the depth to objects within a scene that is captured by first and second cameras of a mobile terminal. A method includes determining, based upon an image including an eye of a user captured by a first camera of a mobile terminal and an image of a scene captured by a second camera of the mobile terminal, two or more angles of a geometric shape defined by the eye, the mobile terminal and an object of the scene. Based upon the image captured by the first camera, the method also determines a first distance from the first camera to the eye. The method further estimates the depth to the object in the scene relative to the mobile terminal based upon the first distance and one or more angles of the geometric shape defined by the eye, the mobile terminal and the object.

20 Claims, 6 Drawing Sheets

(56) References Cited

U.S. PATENT DOCUMENTS

| | | | | |
|---|---|---|---|---|
| 2014/0139667 A1* | 5/2014 | Kang | .................. | H04N 23/611 |
| | | | | 348/143 |
| 2015/0243036 A1* | 8/2015 | Hoffmann | ............ | G06V 40/193 |
| | | | | 382/103 |
| 2016/0078680 A1* | 3/2016 | Reif | ........................ | G06F 3/011 |
| | | | | 345/633 |
| 2016/0134863 A1* | 5/2016 | Horesh | ................ | G06V 10/761 |
| | | | | 348/78 |
| 2017/0007118 A1* | 1/2017 | Alnajar | ................... | G06F 17/18 |
| 2017/0263017 A1 | 9/2017 | Wang | | |
| 2020/0195833 A1* | 6/2020 | Sivan | ....................... | G06F 3/013 |
| 2021/0350559 A1* | 11/2021 | Qi | ............................ | G06T 7/55 |
| 2022/0172319 A1* | 6/2022 | Miller | ................... | H04N 5/2621 |
| 2022/0254111 A1* | 8/2022 | Fukazawa | ............. | G06T 19/006 |

OTHER PUBLICATIONS

Brousseau et al., "Hybrid Eye-Tracking on a Smartphone with CNN Feature Extraction and an Infrared 3D Model", Sensors, vol. 20, No. 2, 2020, pp. 1-21.

"Eye-tracking system uses ordinary cellphone camera", Phys.Org, Retrieved on Feb. 24, 2022, Webpage available at : https://phys.org/news/2016-06-eye-tracking-ordinary-cellphone-camera.html.

"WorldGaze smartphone program enhances AI assistants with image processing", Vision Systems Design, Retrieved on Feb. 24, 2022, Webpage available at : https://www.vision-systems.com/cameras-accessories/article/14178044/worldgaze-smartphone-program-enhances-ai-assistants-with-image-processing.

Mayer et al., "Enhancing Mobile Voice Assistants with WorldGaze", Proceedings of the 2020 CHI Conference on Human Factors in Computing Systems, Apr. 2020, pp. 1-10.

Luo et al., "Consistent Video Depth Estimation", arXiv, ACM Trans. Graph., vol. 39, No. 4, Aug. 26, 2020, pp. 71:1-71:13.

Kuo et al., "Depth from Gaze", 25th IEEE International Conference on Image Processing (ICIP), Oct. 7-10, 2018, pp. 2910-2914.

"MediaPipe Iris: Real-time Iris Tracking & Depth Estimation", Google AI Blog, Retrieved on Feb. 24, 2022, Webpage available at : https://ai.googleblog.com/2020/08/mediapipe-iris-real-time-iris-tracking.html.

Valentin et al., "Depth from Motion for Smartphone AR", ACM Transactions on Graphics, vol. 37, No. 6, Nov. 2018, pp. 193:1-193:19.

Huang et al., "ScreenGlint: Practical, In-situ Gaze Estimation on Smartphones", Proceedings of the 2017 CHI Conference on Human Factors in Computing Systems, May 2017, pp. 2546-2557.

"Eye Tracking", eyeware, Retrieved on Feb. 24, 2022, Webpage available at : https://eyeware.tech/.

Search Report received for corresponding United Kingdom Patent Application No. 2102451.8, dated Nov. 19, 2021, 3 pages.

* cited by examiner

METHOD AND APPARATUS FOR DEPTH ESTIMATION RELATIVE TO A MOBILE TERMINAL

RELATED APPLICATION

This application claims priority to the United Kingdom (GB) patent application number 2102451.8, filed on Feb. 22, 2021, the content of which is incorporated herein by reference in its entirety.

TECHNOLOGICAL FIELD

An example embodiment relates generally to depth estimation to an object in a scene and, more particularly, to a method, apparatus and computer program product configured to provide for depth estimation to an object in a scene relative to a mobile terminal by utilizing images captured by first and second cameras of the mobile terminal, such as the front and rear cameras of the mobile terminal that have forwardly and rearwardly facing fields of view, respectively, relative to the mobile terminal.

BACKGROUND

The depth of an object, such as relative to a person or a mobile terminal carried by the person, may be useful for a variety of purposes. For example, a number of augmented reality (AR) applications rely upon a depth map of a scene in which the distance to each of the plurality of objects within the scene is estimated. In reliance upon the depth map, actions may be performed in the AR application relative to the objects within the scene. As a result of the depth that has been estimated for each of the objects as reflected by the depth map of the scene, the actions that are performed appear to properly correlate with the objects within the scene.

Devices that generate depth maps generally include depth sensors, such as light detection and ranging (LIDAR) sensors to measure the depth to an object within a scene. By including a dedicated depth sensor, the cost of such devices is increased which may reduce the prevalence of such devices and correspondingly reduce the utilization of such devices in order to create depth maps of various scenes, such as for AR applications or otherwise.

BRIEF SUMMARY

The method, apparatus and computer program product are provided in accordance with an example embodiment in order to provide for the depth estimation of objects within a scene that is captured by first and second cameras of a mobile terminal, such as the front and rear cameras of the mobile terminal that have forwardly and rearwardly facing fields of view, respectively, relative to the mobile terminal. By utilizing images captured by first and second cameras of a mobile terminal to estimate the depth of one or more objects within a scene, the depth of respective objects within the scene can be estimated in an efficient manner without reliance upon a dedicated depth sensor, thereby permitting the generation of a depth map utilizing the hardware resources of mobile terminals that are more readily available. Based upon the estimated depth of objects within the scene and the resulting depth map, various applications, including AR applications, can facilitate user interaction, such as virtual interaction, with the objects within the scene.

In an example embodiment, a method is provided that includes determining, based upon an image including an eye of a user captured by a first camera of a mobile terminal and an image of a scene captured by a second camera of the mobile terminal, two or more angles of a geometric shape defined by the eye of the user, the mobile terminal and an object of the scene. Based upon the image including the eye of the user captured by the first camera of the mobile terminal, the method also includes determining a first distance from the first camera of the mobile terminal to the eye of the user. The method further includes providing for depth estimation to the object in the scene relative to the mobile terminal based upon the first distance and one or more angles of the geometric shape defined by the eye of the user, the mobile terminal and the object of the scene.

The method of an example embodiment determines two or more angles of the geometric shape by determining, based upon the image including the eye of the user captured by the first camera of the mobile terminal, a first angle between a gaze direction of the eye of the user and a path between the mobile terminal and the eye of the user. Based upon the image of the scene captured by the second camera of the mobile terminal and the image including the eye of the user captured by the first camera of the mobile terminal, the method of this example embodiment determines a second angle between a path between the mobile terminal and the object in the scene and the path between the mobile terminal and the eye of the user and determines a third angle between the path between the mobile terminal and the object in the scene and a path between the eye of the user and the object in the scene. In this example embodiment, the method may provide for depth estimation by providing for depth estimation of the object in the scene relative to the mobile terminal based upon the first distance, the first angle and the third angle.

The method of an example embodiment also includes causing an instruction to be provided to the user to gaze at the object in the scene prior to the image including the eye of the user being captured by the first camera of the mobile terminal. In an example embodiment, the method further includes receiving information identifying the object in the scene to which a gaze of the user is directed. The method may also include creating a depth map of at least a portion of the scene based at least partially upon the depth estimation of the object in the scene relative to the mobile terminal. In an example embodiment, the method also includes receiving information regarding a change in position of the mobile terminal relative to a position of the mobile terminal at a time at which the image including the eye of the user was captured by the first camera of the mobile terminal and the image of the scene was captured by the second camera of the mobile terminal. The method of this example embodiment further includes modifying the depth estimation based upon the change in position of the mobile terminal.

Based upon an image including a second eye of the user captured by the first camera of the mobile terminal and the image of the scene captured by the second camera of the mobile terminal, the method of an example embodiment also includes determining two or more angles of a geometric shape defined by the second eye of the user, the mobile terminal and the object of the scene. In this example embodiment, the method further includes determining, based upon the image including the second eye of a user captured by the first camera of the mobile terminal, a second distance from the first camera of the mobile terminal to the second eye of the user. The method of this example embodiment may also provide for depth estimation by providing for depth estimation to the object in the scene relative to the mobile terminal also based upon the second distance and one or more angles of the geometric shape defined by the second eye of the user, the mobile terminal and the object of the scene.

In another example embodiment, an apparatus is provided that includes at least one processor and at least one memory including computer program code with the at least one memory and computer program code configured to, with the at least one processor, cause the apparatus to at least determine, based upon an image including an eye of a user captured by a first camera of a mobile terminal and an image of a scene captured by a second camera of the mobile terminal, two or more angles of a geometric shape defined by the eye of the user, the mobile terminal and an object of the scene. Based upon the image including the eye of the user captured by the first camera of the mobile terminal, the at least one memory and computer program code are also configured to, with the at least one processor, cause the apparatus to determine a first distance from the first camera of the mobile terminal to the eye of the user. The at least one memory and computer program code are further configured to, with the at least one processor, cause the apparatus to provide for depth estimation to the object in the scene relative to the mobile terminal based upon the first distance and one or more angles of the geometric shape defined by the eye of the user, the mobile terminal and the object of the scene.

The at least one memory and computer program code are configured to, with the at least one processor, cause the apparatus of an example embodiment to determine two or more angles of the geometric shape by determining, based upon the image including the eye of the user captured by the first camera of the mobile terminal, a first angle between a gaze direction of the eye of the user and a path between the mobile terminal and the eye of the user, determining, based upon the image of the scene captured by the second camera of the mobile terminal and the image including the eye of the user captured by the first camera of the mobile terminal, a second angle between a path between the mobile terminal and the object in the scene and the path between the mobile terminal and the eye of the user and determining a third angle between the path between the mobile terminal and the object in the scene and a path between the eye of the user and the object in the scene. In this example embodiment, the at least one memory and computer program code may be configured to, with the at least one processor, cause the apparatus to provide for depth estimation of the object in the scene relative to the mobile terminal based upon the first distance, the first angle and the third angle.

The at least one memory and computer program code are also configured to, with the at least one processor, cause the apparatus of an example embodiment to cause an instruction to be provided to the user to gaze at the object in the scene prior to the image including the eye of the user being captured by the first camera of the mobile terminal. In an example embodiment, the at least one memory and computer program code are configured to, with the at least one processor, cause the apparatus to receive information identifying the object in the scene to which a gaze of the user is directed. The at least one memory and computer program code may also be configured to, with the at least one processor, cause the apparatus of an example embodiment to create a depth map of at least a portion of the scene based at least partially upon the depth estimation of the object in the scene relative to the mobile terminal. The first and second cameras may have fields of view on opposite sides of the mobile terminal. In an example embodiment, the at least one memory and computer program code are further configured to, with the at least one processor, cause the apparatus to receive information regarding a change in position of the mobile terminal relative to a position of the mobile terminal at a time at which the image including the eye of the user was captured by the first camera of the mobile terminal and the image of the scene was captured by the second camera of the mobile terminal. The at least one memory and computer program code are also configured to, with the at least one processer, cause the apparatus of this example embodiment to modify the depth estimation based upon the change in position of the mobile terminal.

The at least one memory and computer program code are also configured to, with the at least one processor, cause the apparatus of an example embodiment to determine, based upon an image including a second eye of the user captured by the first camera of the mobile terminal and the image of the scene captured by the second camera of the mobile terminal, two or more angles of a geometric shape defined by the second eye of the user, the mobile terminal and the object of the scene. The at least one memory and computer program code are additionally configured to, with the at least one processor, cause the apparatus of this example embodiment to determine, based upon the image including the second eye of a user captured by the first camera of the mobile terminal, a second distance from the first camera of the mobile terminal to the second eye of the user. In this example embodiment, the at least one memory and computer program code are also configured to, with the at least one processor, cause the apparatus to provide for depth estimation to the object in the scene relative to the mobile terminal that is also based upon the second distance and one or more angles of the geometric shape defined by the second eye of the user, the mobile terminal and the object of the scene.

In a further example embodiment, an apparatus is provided that includes means, based upon an image including an eye of a user captured by a first camera of a mobile terminal and an image of a scene captured by a second camera of the mobile terminal, for determining two or more angles of a geometric shape defined by the eye of the user, the mobile terminal and an object of the scene. Based upon the image including the eye of the user captured by the first camera of the mobile terminal, the apparatus also includes means for determining a first distance from the first camera of the mobile terminal to the eye of the user. The apparatus further includes means for providing for depth estimation to the object in the scene relative to the mobile terminal based upon the first distance and one or more angles of the geometric shape defined by the eye of the user, the mobile terminal and the object of the scene.

The means for determining two or more angles of the geometric shape may include means, based upon the image including the eye of the user captured by the first camera of the mobile terminal, for determining a first angle between a gaze direction of the eye of the user and a path between the mobile terminal and the eye of the user, means, based upon the image of the scene captured by the second camera of the mobile terminal and the image including the eye of the user captured by the first camera of the mobile terminal, for determining a second angle between a path between the mobile terminal and the object in the scene and the path between the mobile terminal and the eye of the user and means for determining a third angle between the path between the mobile terminal and the object in the scene and a path between the eye of the user and the object in the scene.

In this example embodiment, the means for providing for depth estimation may include means for providing for depth estimation of the object in the scene relative to the mobile terminal based upon the first distance, the first angle and the third angle.

The apparatus of an example embodiment may also include means for causing an instruction to be provided to the user to gaze at the object in the scene prior to the image including the eye of the user being captured by the first camera of the mobile terminal. In an example embodiment, the apparatus also includes means for receiving information identifying the object in the scene to which a gaze of the user is directed. The apparatus of an example embodiment may also include means for creating a depth map of at least a portion of the scene based at least partially upon the depth estimation of the object in the scene relative to the mobile terminal. The first and second cameras may have fields of view on opposite sides of the mobile terminal. In an example embodiment, the apparatus also includes means for receiving information regarding a change in position of the mobile terminal relative to a position of the mobile terminal at a time at which the image including the eye of the user was captured by the first camera of the mobile terminal and the image of the scene was captured by the second camera of the mobile terminal. The apparatus of this example embodiment further includes means for modifying the depth estimation based upon the change in position of the mobile terminal.

The apparatus of an example embodiment also includes means, based upon an image including a second eye of the user captured by the first camera of the mobile terminal and the image of the scene captured by the second camera of the mobile terminal, for determining two or more angles of a geometric shape defined by the second eye of the user, the mobile terminal and the object of the scene. The apparatus of this example embodiment also includes means, based upon the image including the second eye of a user captured by the first camera of the mobile terminal, for determining a second distance from the first camera of the mobile terminal to the second eye of the user. In this example embodiment, the means for providing for depth estimation includes means for providing for depth estimation to the object in the scene relative to the mobile terminal also based upon the second distance and one or more angles of the geometric shape defined by the second eye of the user, the mobile terminal and the object of the scene.

In yet another example embodiment, a computer program product is provided that includes a non-transitory computer readable storage medium having program code portions stored thereon with the program code portions configured, upon execution, to determine, based upon an image including an eye of a user captured by a first camera of a mobile terminal and an image of a scene captured by a second camera of the mobile terminal, two or more angles of a geometric shape defined by the eye of the user, the mobile terminal and an object of the scene. The program code portions are also configured to determine, based upon the image including the eye of the user captured by the first camera of the mobile terminal, a first distance from the first camera of the mobile terminal to the eye of the user and program code portions configured to provide for depth estimation to the object in the scene relative to the mobile terminal based upon the first distance and one or more angles of the geometric shape defined by the eye of the user, the mobile terminal and the object of the scene.

The program code portions configured to determine two or more angles of the geometric shape may include program code portions configured, upon execution, to determine, based upon the image including the eye of the user captured by the first camera of the mobile terminal, a first angle between a gaze direction of the eye of the user and a path between the mobile terminal and the eye of the user, program code portions configured to determine, based upon the image of the scene captured by the second camera of the mobile terminal and the image including the eye of the user captured by the first camera of the mobile terminal, a second angle between a path between the mobile terminal and the object in the scene and the path between the mobile terminal and the eye of the user and program code portions configured to determine a third angle between the path between the mobile terminal and the object in the scene and a path between the eye of the user and the object in the scene.

The program code portions configured to provide for depth estimation may include program code portions configured, upon execution, to provide for depth estimation of the object in the scene relative to the mobile terminal based upon the first distance, the first angle and the third angle. In an example embodiment, the program code portions are further configured, upon execution, to cause an instruction to be provided to the user to gaze at the object in the scene prior to the image including the eye of the user being captured by the first camera of the mobile terminal. The program code portions of an example embodiment are further configured, upon execution, to receive information identifying the object in the scene to which a gaze of the user is directed. In an example embodiment, the program code portions are further configured, upon execution, to create a depth map of at least a portion of the scene based at least partially upon the depth estimation of the object in the scene relative to the mobile terminal.

The program code portions of an example embodiment are further configured, upon execution, to determine, based upon an image including a second eye of the user captured by the first camera of the mobile terminal and the image of the scene captured by the second camera of the mobile terminal, two or more angles of a geometric shape defined by the second eye of the user, the mobile terminal and the object of the scene. The program code portions of this example embodiment are also configured to determine, based upon the image including the second eye of a user captured by the first camera of the mobile terminal, a second distance from the first camera of the mobile terminal to the second eye of the user. In this example embodiment, the program code portions configured to provide for depth estimation include program code portions configured, upon execution, to provide for depth estimation to the object in the scene relative to the mobile terminal also based upon the second distance and one or more angles of the geometric shape defined by the second eye of the user, the mobile terminal and the object of the scene.

The program code portions of an example embodiment are further configured, upon execution, to receive information regarding a change in position of the mobile terminal relative to a position of the mobile terminal at a time at which the image including the eye of the user was captured by the first camera of the mobile terminal and the image of the scene was captured by the second camera of the mobile terminal. In this example embodiment, the program code portions are also configured, upon execution, to modify the depth estimation based upon the change in position of the mobile terminal.

BRIEF DESCRIPTION OF THE DRAWINGS

Having thus described embodiments of the disclosure in general terms, reference will now be made to the accompanying drawings, which are not necessarily drawn to scale, and wherein:

DETAILED DESCRIPTION

Some embodiments of the present disclosure will now be described more fully hereinafter with reference to the accompanying drawings, in which some, but not all, embodiments are shown. Indeed, various embodiments can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

Figure 1:
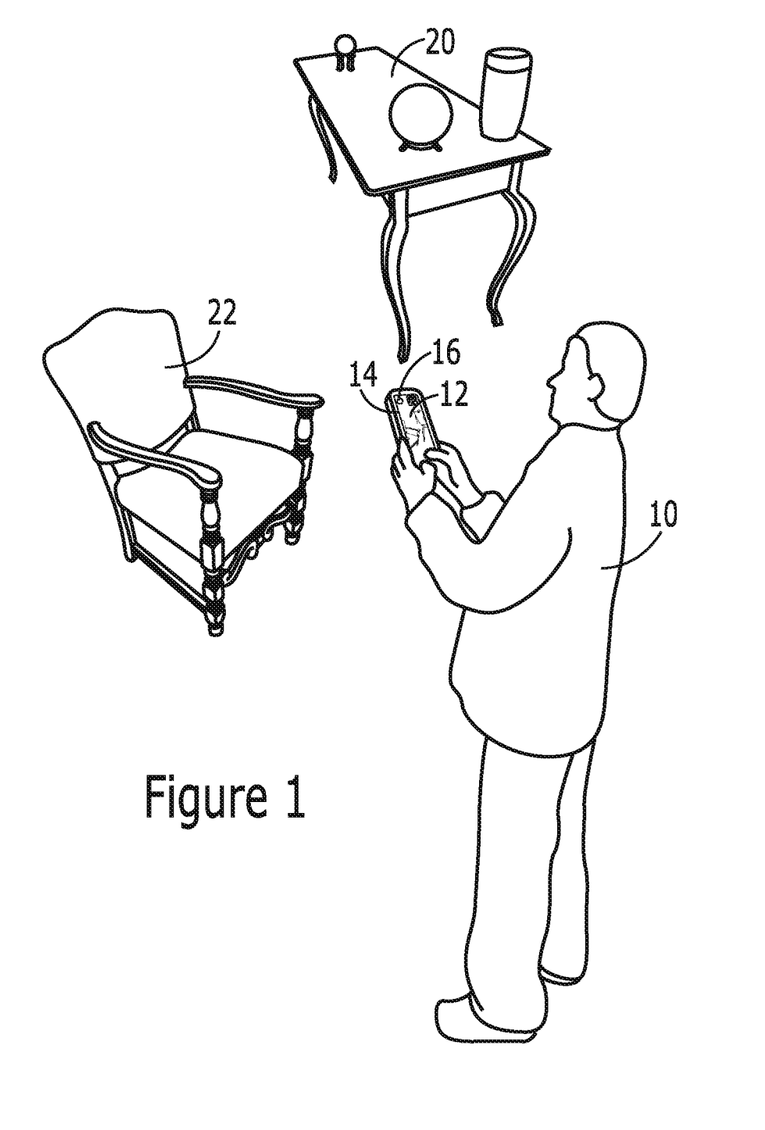
FIG. 1 is a perspective view of a scene visible to a user holding a mobile terminal that may be configured in accordance with an example embodiment of the present disclosure.

The method, apparatus and computer program product are provided in accordance with an example embodiment in order to provide for depth estimation to one or more objects in a scene captured by a camera of a mobile terminal associated with, such as carried by, a user. By way of example, FIG. 1 depicts the user 10 holding a mobile terminal 12. The mobile terminal may be any of a variety of mobile devices including, for example, for example, a personal digital assistant (PDA), mobile telephone, smart phone, a gaming device, personal navigation device, smart watch, tablet computer, or any combination of the aforementioned and other types of portable computing and/or communication devices.

The mobile terminal 12 has first and second cameras with different fields of view. In an example embodiment, the first and second cameras have fields of view that extend in opposite directions relative to the housing 14 of the mobile terminal. For example, the mobile terminal may have a first camera 16 having a rearwardly facing field of view. Thus, the user 10 can hold the mobile terminal such that the image captured by the first camera includes the face or at least an eye of the user. In contrast, the second camera 18 of the mobile terminal may have a forwardly facing field of view such that an image captured by the second camera includes the scene that is visible to the user. The images captured by the first and second cameras may be still images, such as photographs, frames of a video or other types of images. Moreover, while referenced herein as first and second cameras, the first and second cameras can be any type of image capture devices configured to capture an image with the respective field of view.

As shown in FIG. 1, the mobile terminal 12 may have a form factor such that the user 10 can hold the mobile terminal and position the mobile terminal such that the field of view of the first camera 16 includes the face of the user and the field of view of the second camera 18 includes at least a portion of the scene viewed by the user for which objects therewithin are to be subjected to depth estimation. In at least some embodiments, the mobile terminal does not include a dedicated depth sensor, such as a LIDAR sensor, and, as such, may be more cost effective while still being capable of estimating the depth of an object relative to the mobile terminal and, in turn, the user and, in some embodiments, capable of defining a depth map of object(s) within a scene captured by the second camera of the mobile terminal. In the illustrated example, the table 20 and the chair 22 are objects within the scene that have respective depths relative to the mobile terminal and, in turn, the user.

Figure 2:
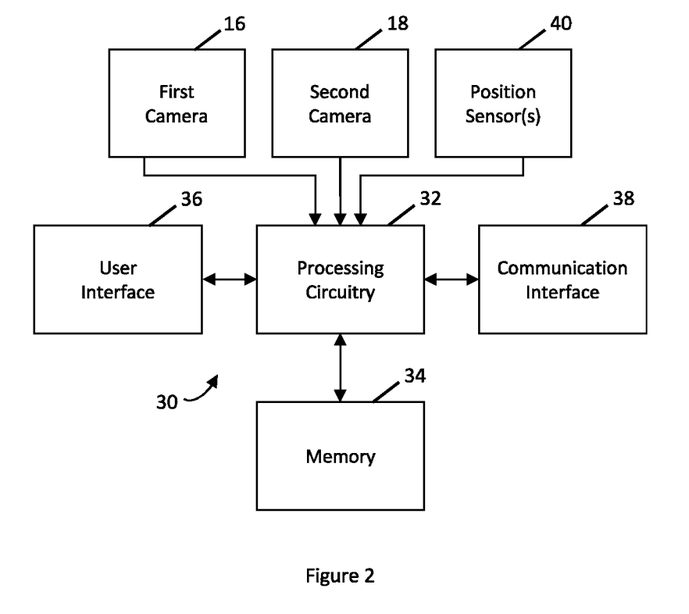
FIG. 2 is a block diagram of an apparatus, such as may be embodied by the mobile terminal of FIG. 1, that may be specifically configured in accordance with an example embodiment of the present disclosure.

In accordance with an example embodiment, an apparatus 30 is configured to provide for depth estimation of an object within the scene of an image captured by the second camera 18 of a mobile terminal 12. The apparatus may be embodied by the mobile terminal or may be embodied by another computing device that is either in communication with the mobile terminal so as to receive the images captured by the first and second cameras of the mobile terminal or otherwise able to access or receive the images captured by the first and second cameras of the mobile terminal, such as by accessing the images captured by the first and second cameras of the mobile terminal that have been stored by a database. Regardless of the manner in which the apparatus is embodied, the apparatus of an example embodiment includes, is associated with or is otherwise in communication with processing circuitry 32 and a memory device 34 and optionally a user interface 36 and a communication interface 38 as shown in FIG. 2.

In some embodiments, the processing circuitry 32 (and/or co-processors or any other processors assisting or otherwise associated with the processing circuitry) can be in communication with the memory device 34 via a bus for passing information among components of the apparatus 30. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 32 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, reference herein to processing circuitry includes performance of the associated function(s) by at least one processor. In some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 32 can be configured to execute instructions stored in the memory device 34 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 30 may also optionally include a user interface 36 that may, in turn, be in communication with the processing circuitry 32 to provide output to the user 10 and, in some embodiments, to receive an indication of a user input. The user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 34, and/or the like).

The apparatus 30 of an example embodiment can also include the communication interface 38. The communication interface can be any means such as a device or circuitry embodied in either hardware or a combination of hardware and software that is configured to receive and/or transmit data from/to other electronic devices in communication with the apparatus, such as by providing for communication between a mobile device and a server and/or between a mobile device and one or more access points. The communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

In the embodiment in which the apparatus 30 is embodied by the mobile terminal 12, the apparatus may also include the first and second cameras 16, 18 as shown in FIG. 2. However, the apparatus of other example embodiments need not include the first and second cameras, but can, instead, be in communication with the first and second cameras, such as via the communication interface 38, to receive the images captured thereby or may be in communication, such as via the communication interface, with a database or other memory device that stores the images captured by the first and second cameras.

As also shown in FIG. 2, the apparatus 30 of an example embodiment may include one or more position sensor(s) 40, such as one or more accelerometers, gyroscopes, global positioning system (GPS) sensors or the like, that are configured to provide information from which the position of the mobile terminal 12 is defined. In this regard, the position may be explicitly defined, such as in terms of latitude and longitude, or may be defined in a relative manner, such as relative to the position at which the mobile terminal was located at the time at which the images were captured by the first and second cameras 16, 18 from which the depth to an object in the scene is estimated as described hereinafter. In other example embodiments, the apparatus need not include the position sensor(s) but, instead, receives the information that defines the position of the mobile terminal, such as from the mobile terminal itself or from a database or other memory device 34 that stores information regarding the position of the mobile terminal as defined by the positions sensor(s).

Figure 3:
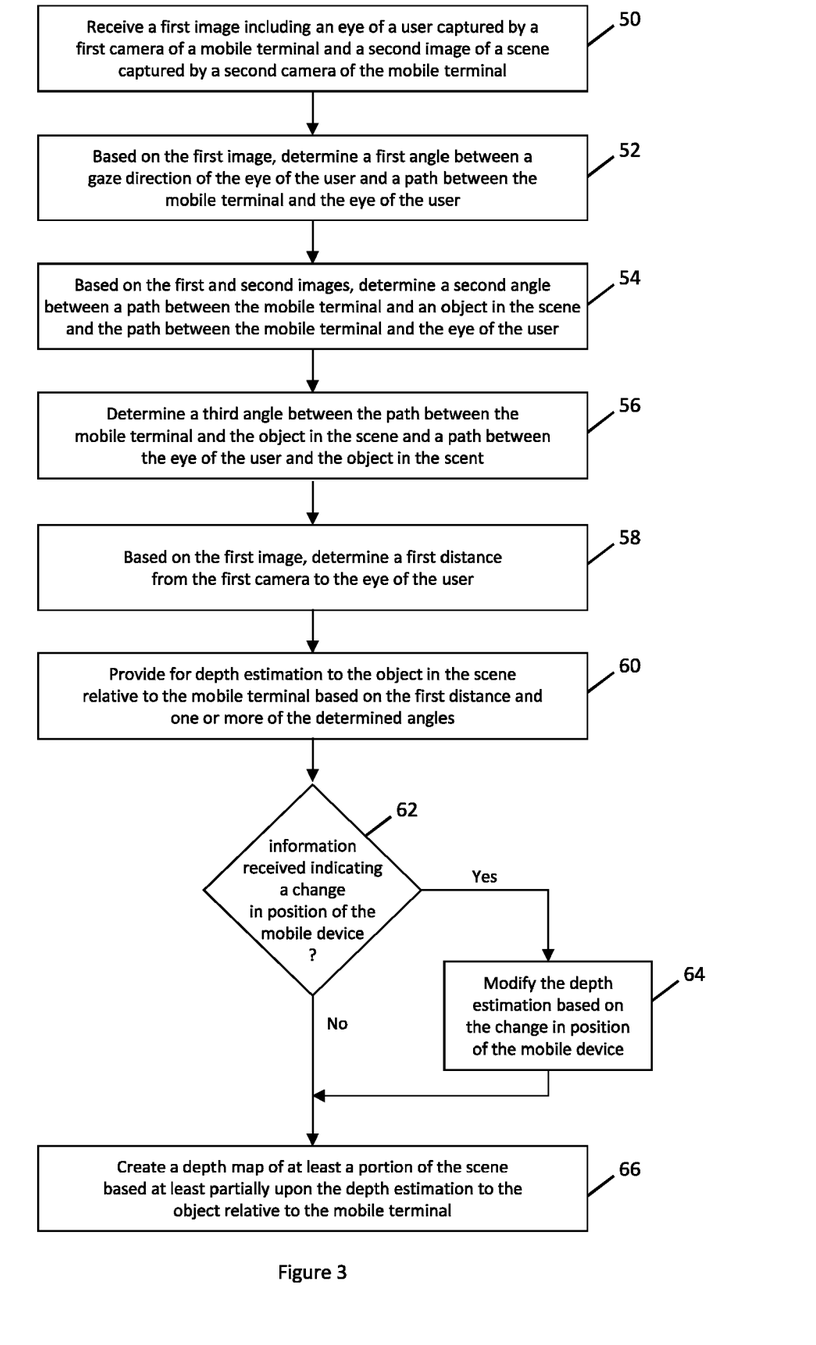
FIG. 3 is a flow chart illustrating operations performed, such as by the apparatus of FIG. 2, in accordance with an example embodiment of the present disclosure.

Referring now to FIG. 3, the operations performed, such as by the apparatus 30 of FIG. 2, in accordance with an example embodiment, are depicted. As shown in block 50, the apparatus includes means, such as the processing circuitry 32, the communication interface 38 or the like, for receiving a first image including an eye of the user 10 captured by the first camera 16 of the mobile terminal 12 and a second image of a scene, such as the scene visible to the user and/or the mobile terminal, captured by the second camera 18 of the mobile terminal. While the first image that is captured by the first camera of the mobile terminal, such as the rearwardly facing camera of the mobile terminal, includes at least one eye of the user and, in some embodiments both eyes of the user, the first image may include additional features, such as all or part of a face of the user.

The apparatus 30 of this example embodiment also includes means, such as the processing circuitry 32 or the like, for determining, based on the first image, a first angle between the gaze direction of the eye of the user 10 and a path defined between the mobile terminal 12 and the eye of the user. See block 52 of FIG. 3. In an instance in which the first image captured by the first camera 16 includes only one eye of the user, the gaze direction is defined by the one eye of the user that is depicted in the first image. However, in an instance in which the first image captured by the first camera includes both eyes of the user, the gaze direction is defined by a respective eye, either the right eye or the left eye, of the user. With respect to the path defined between the mobile terminal and the eye of the user, the path may be defined between the lens of the first camera of the mobile terminal that captures the first image including the respective eye of the user and the eye of user.

Figure 4:
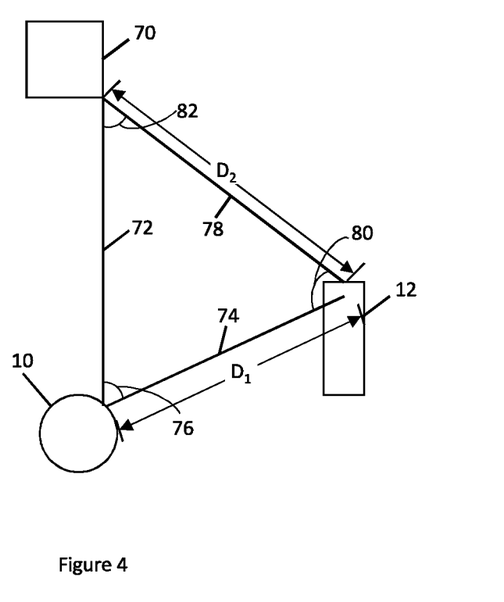
FIG. 4 is a graphical representation of the geometrical relationship between a user, a mobile terminal and an object in accordance with an example embodiment of the present disclosure.

By way of example of the first angle that is determined, such as by the processing circuitry 32, in accordance with an example embodiment, FIG. 4 depicts the geometrical relationship between the user 10, the mobile terminal 12 and an object 70. In this illustration, the gaze direction of a respective eye of the user is depicted at 72, while the path between the mobile terminal and, more particularly, the lens of the first camera 16 of the mobile terminal and the respective eye of the user is depicted at 74 As such, the first angle defined between the gaze direction and the path between the mobile terminal and the eye of the user is depicted at 76.

The apparatus 30, such as the processing circuitry 32, may be configured to determine the first angle 76 in various manners. In an example embodiment, however, the apparatus, such as the processing circuitry, is configured to determine the first angle by determining the gaze direction 72 utilizing, for example, WorldGaze™ software and also determining the path between the first camera 16 and the eye of the user 10. The apparatus, such as the processing circuitry, may be configured to determine the path between the first camera and the eye of the user by identifying the pixels within the first image that correspond to the eye of the user. The position of the pixels in the first image have a static angular relationship relative to the plane of the first camera, thereby permitting the path to be defined therebetween. In some embodiments in which a plurality of pixels correspond to the eye of the user, the location of the eye may be defined by the centermost pixel of the pixels that correspond to the eye of the user or the pixel having the average location from among the pixels that correspond to the eye of the user. The path between the first camera and the eye of the user may then be defined, such as by the processing circuitry, as the path that extends from the location of the mobile terminal 12 and, in one embodiment, the location of the lens of the first camera of the mobile terminal and the location of the eye of the user. The apparatus, such as the processing circuitry, of this example embodiment is then configured to determine the first angle between the gaze direction and the path between the first camera of the mobile terminal and the eye of the user.

As shown in block 54 of FIG. 3, the apparatus 30 also includes means, such as the processing circuitry 32 or the like, for determining, based on the first and second images captured by the first and second cameras 16, 18, respectively, of the mobile terminal 12, a second angle between a path between the mobile terminal and an object in the scene and the path between the mobile terminal and the eye of the user 10. Relative to the example of FIG. 4, the path between the mobile terminal and an object 70 in the scene, such as the front right corner of a rectangular object within the scene, is designated as 78, while the path between the mobile terminal and the eye of the user is designated at 74 as described above. In this regard, the path between the mobile terminal and the object in the scene may more particularly be defined as the path between the second camera 18, such as the lens of the second camera of the mobile terminal, and the object in the scene. In addition, the path between the mobile terminal and the eye of the user may be defined relative to the same eye of the user as referenced above in conjunction with the determination of the first angle 76. With further reference to the example of FIG. 4, the second angle is defined as 80.

Although the apparatus 30, such as the processing circuitry 32, may be configured to determine the second angle 80 in various manners, the apparatus, such as the processing circuitry, of an example embodiment is configured to determine the second angle based upon an analysis of the first and second images captured by the first and second cameras 16, 18, respectively. As a result of the static relationship between the position of the pixels in an image and the plane of the respective camera, each pixel position within a respective image corresponds to a predefined angle relative to the mobile terminal 12 such that the apparatus, such as the processing circuitry, is configured to determine the angle of the object with respect to the second camera and the angle of the eye of the user with respect to the first camera. Based upon the angle of the object with respect to the second camera and the angle of the eye of the user with respect to the first camera as well as the angular difference, e.g., 180°, between the viewing axes of the first and second cameras, the apparatus, such as the processing circuitry, of this example embodiment is configured to determine the second angle.

As noted above, in some embodiments in which a plurality of pixels correspond to the eye of the user 10, the location of the eye may be defined by the centermost pixel of the pixels that correspond to the eye of the user and/or the pixel having the average location from among the pixels that correspond to the eye of the user. Similarly, in some embodiments in which a plurality of pixels correspond to the object, the location of the object may be defined by the centermost pixel of the pixels that correspond to the object and/or the pixel having the average location from among the pixels that correspond to the object.

As shown in block 56, the apparatus 30 of this example embodiment also includes means, such as the processing circuitry 32 or the like, for determining a third angle between the path between the mobile terminal 12 and the object in the scene and the path between the eye of the user 10 and the object in the scene. In the example of FIG. 4, the path between the eye of the user and the object 70 in the scene is defined by the gaze direction 72 of the respective eye of the user, while the path between the mobile terminal, such as the second camera 18 of the mobile terminal and, more particularly, the lens of the second camera of the mobile terminal, and the object in the scene is designated as 78. As a result, the third angle is designated as 82 in FIG. 4.

In an example embodiment, the apparatus 30, such as the processing circuitry 32, is configured to determine the third angle 82 based upon the first and second angles 76, 80. In this regard, the three interior angles of a triangle sum to 180°. Thus, the apparatus, such as the processing circuitry, of an example embodiment is configured to determine the third angle to be equal to the difference between 180° and the sum of the first and second angles.

As shown in block 58 of FIG. 3, the apparatus 30 further includes means, such as the processing circuitry 32 or the like, for determining, based on the first image captured by the first camera 16 of the mobile terminal 12, a first distance from the first camera to the eye of the user 10. In this regard, the first distance is the distance from the first camera to the same eye of the user that is utilized to define the gaze direction 72 as well as the path 74 between the mobile terminal and the eye of the user. With reference to illustration of FIG. 4, the first distance is shown as $D_1$.

The apparatus 30, such as the processing circuitry 32, may be configured to determine the first distance $D_1$ in various manners. In an example embodiment, however, the apparatus, such as the processing circuitry, is configured to determine the first distance by utilizing the MediaPipe Iris™ system developed by Google LLC.

The apparatus 30 of this example embodiment also includes means, such as the processing circuitry 32 or the like, for providing for depth estimation to the object in the scene relative to the mobile terminal 12 based on the first distance $D_1$ and one or more of the determined angles, that is, one or more of the first, second and third angles 76, 80, 82. See block 60 of FIG. 3. Relative to the example of FIG. 4, the apparatus, such as the processing circuitry, may be configured to estimate the depth of the object 70 based upon the distance $D_2$ from the mobile terminal 12 to the object in the scene, e.g., the front right corner of the rectangular object in the scene.

Although the apparatus 30, such as the processing circuitry 32, of an example embodiment may be configured to estimate the depth to the object in the scene in various manners, the apparatus, such as the processing circuitry, of an example embodiment is configured to estimate the depth to the object in the scene from the mobile terminal 12 utilizing the sine rule. In this example embodiment, the apparatus, such as the processing circuitry, may be configured to estimate the depth to the object by determining the distance $D_2$ from the mobile terminal 12 to the object in the scene as follows: $D_2=(D_1*\sin(\text{First Angle 76}))/\sin(\text{Second Angle 80})$.

As a result of the depth estimation to an object in the scene, the apparatus 30, such as the processing circuitry 32, of an example embodiment includes means, such as the processing circuitry or the like, for creating a depth map of at least a portion of the scene.

See block 66 of FIG. 3. Although the depth map may be created based upon the estimated depth to a single object within the scene, such as the object 70 in FIG. 4, the depth map of other example embodiments includes the estimated depths to a plurality of objects within the scene, thereby providing a fulsome set of depth information, such as for use in AR applications or the like.

In an example embodiment, the object in the scene to which the gaze of the user 10 is to be directed is identified prior to capture of the first image. For example, the apparatus 30 of one embodiment includes means, such as the processing circuitry 32, the user interface 36 or the like, for causing an instruction to be provided to the user that directs the user to gaze at a particular object in the scene prior to the first image including the eye of the user being captured by the first camera 16 of the mobile terminal 12. The instruction may be provided in various manners. For example, the apparatus, such as the processing circuitry, may be configured to cause an image of the scene to be presented upon the user interface, such as upon a display screen, with the object in the scene that is to be the subject of the user's gaze being highlighted or otherwise designated. Additionally or alternatively, the apparatus, such as the processing circuitry, may be configured to cause the name or other identifying information regarding the object that is to be the subject of the gaze of the user to be provided, such as by presenting the name of the object upon the user interface, e.g., the display screen, and/or by audibly announcing the name of the object, such as via one or more speakers or other audio output devices of the mobile terminal. Based upon the instruction provided to the user, the user gazes at the object that was the subject of the instruction and the process for estimating the depth of the object in the scene as described above in relation to FIG. 3 is then performed.

Alternatively, the apparatus 30 may include means, such as the processing circuitry 32, the user interface 36 or the like, for receiving information identifying the object in the scene to which the gaze of the user 10 is directed. The information may be provided, for example, by the user. The user may provide the information in various manners. In one example embodiment, an image of the scene is presented by the user interface, such as upon a display screen, and the user is able to identify the object from within the image of the scene, such as by touching or otherwise selecting the object depicted by the display screen. In another example embodiment, the user can provide the name or other information identifying the object via the user interface, such as by the entry of alphanumeric characters via a keypad, by a gesture input or audibly by way of audible signals captured by one or more microphones of the mobile terminal 12. Once the object in the scene has been identified, the user can gaze at the object while the process for estimating the depth to the object that is described above in conjunction with FIG. 3 is then performed.

The object to be the subject to of the user's gaze may be generally identified. Or, a particular portion of the object may be identified to be the subject of the user's gaze, such as a particular corner of a table. In this regard, the identification of a particular portion of the object may increase the accuracy and decrease the spatial uncertainty associated with the determination of the gaze direction. For example, the identification of the front, left corner of a table to be the object that is the subject of the user's gaze allows for the gaze direction to be identified with more specificity than the identification of the table in general. As such, the apparatus, such as the processing circuitry, of an example embodiment may be configured to determine the specificity with which the object is identified based upon the spatial uncertainty to be associated with the gaze direction. In this regard, the specificity with which the object is identified has an inverse relationship to the spatial uncertainty associated with the gaze direction. While the specificity with which the object is identified is based upon the level of granularity that is specified by the instructions, the specificity with which the object is identified may also be based upon the size of the object within the image. In this regard, the size of the object within the image may have a direct relationship to the spatial uncertainty associated with the gaze direction with objects that appear smaller in the image allowing for reduced spatial uncertainty relative to objects that appear larger in the image. Further, different portions of the same object may be sequentially identified, such as by directing the user to direct their gaze so as to outline the object.

As described, the depth to an object within a scene may be estimated while the mobile terminal 12 remains in the same position relative to the object within the scene. Following the estimation of the depth to the object in the scene, the mobile terminal may be repositioned relative to the object in the scene. By tracking the movement of the mobile terminal with respect to the position of the mobile terminal at the time at which the image of the scene including the object was captured, the depth that has been estimated to the object in the scene may be correspondingly updated as the mobile terminal moves without having to capture additional images with the first and second cameras 16, 18 of the mobile terminal and then repeating the process as described above relative to FIG. 3.

In this example embodiment, the apparatus 30 includes means, such as the processing circuitry 32, the position sensor(s) 40, the communication interface 38 or the like, for receiving information indicating a change in position of the mobile terminal 12 following the capture of the first and second images. See block 62 of FIG. 3. For example, the position of the mobile terminal may be defined, such as by a GPS sensor, at the time at which the first and second images are captured by the first and second cameras, respectively and again following repositioning of the mobile terminal. In an instance in which the information indicates a change in position of the mobile terminal, such as based upon a comparison of the positions of the mobile terminal at the time at which the first and second images are captured and then following repositioning of the mobile terminal, the apparatus, such as the processing circuitry, is configured to determine the change in position of the mobile terminal relative to the object in the scene such that the depth estimation to the object in the scene may be similarly modified. See block 64.

Alternatively, the position of the mobile terminal 12 at the time at which the first and second images are captured by the first and second cameras 16, 18, respectively, may not be defined, but the movement of the mobile terminal thereafter may be tracked, such as by one or more position sensors 40 such that the apparatus 30, e.g., the processing circuitry 32, is configured to determine the change in position of the mobile device relative to the object within the scene. In this example embodiment, the apparatus also includes means, such as the processing circuitry or the like, for modifying the depth estimation based on the change in position of the mobile terminal, such as by taking into account the change in position of the mobile device relative to the object in the scene and correspondingly modifying the depth estimation. For example, in an instance in which the mobile terminal is determined to move toward the object within the scene, the depth estimation may be decreased by an amount equal to the distance moved by the mobile terminal. Alternatively, in an instance in which the mobile terminal is determined to move away from the object within the scene, the depth estimation to the object may be increased by an equal amount to the distance moved by the mobile terminal. In any event, the tracking of the movement of the mobile terminal following the estimation of the depth of the object in the scene while the mobile terminal is at a first position permits the depth to be estimated to the same object within the scene following the movement of the mobile terminal to a second, different position without repeating the process described above relative to FIG. 3 in order to newly determine the depth estimation for the object in the scene.

As described above, the apparatus 30, such as the processing circuitry 32, may be configured to estimate the depth to an object within the scene based upon the gaze of one eye of the user 10 upon the object. In some example embodiments, however, the apparatus, such as the processing circuitry, is configured to separately estimate the depth to the same object within the scene based upon the gaze of each of the user's two eyes, such as based upon the gaze of the first eye of the user to the object in the scene and also based upon the gaze of the second eye of the user upon the same object in the scene. In this example embodiment, the process described above in conjunction with FIG. 3 is repeated for each of the first eye and the second eye of the user. In an instance in which the first image captured by the first camera 16 includes both eyes of the user, the same first image may be utilized in conjunction with the estimation of the depth to the object with reference to each of the first eye and the second eye of the user. However, if the first image captured by the first camera includes only one eye of the user, another first image is captured by the first camera of the mobile terminal 12 that includes the second eye of the user while the mobile terminal remains in the same position with respect to the object in the scene. Thereafter, the process described above in conjunction with FIG. 3 is repeated first relative to one eye of the user and then relative to the other eye of the user.

In this example embodiment, the apparatus 30, such as the processing circuitry 32, is configured to provide for depth estimation to the object in the scene relative to the mobile terminal 12 based on the depth estimation to the object in the scene relative to the first eye of the user 10 and based on the depth estimation to the object in the scene relative to the second eye of the user. In this regard, the apparatus, such as the processing circuitry, of an example embodiment may be configured to combine the depth estimates to the object in the scene based upon the first and second eyes of the user, such as by determining an average of the depth estimated to the object in the scene relative to the first and second eyes of the user. By combining the depth estimates to object in the scene as determined based on the first and second eyes of the user, the resulting depth estimation may be more accurate and/or may be provided with increased confidence.

Figure 5:
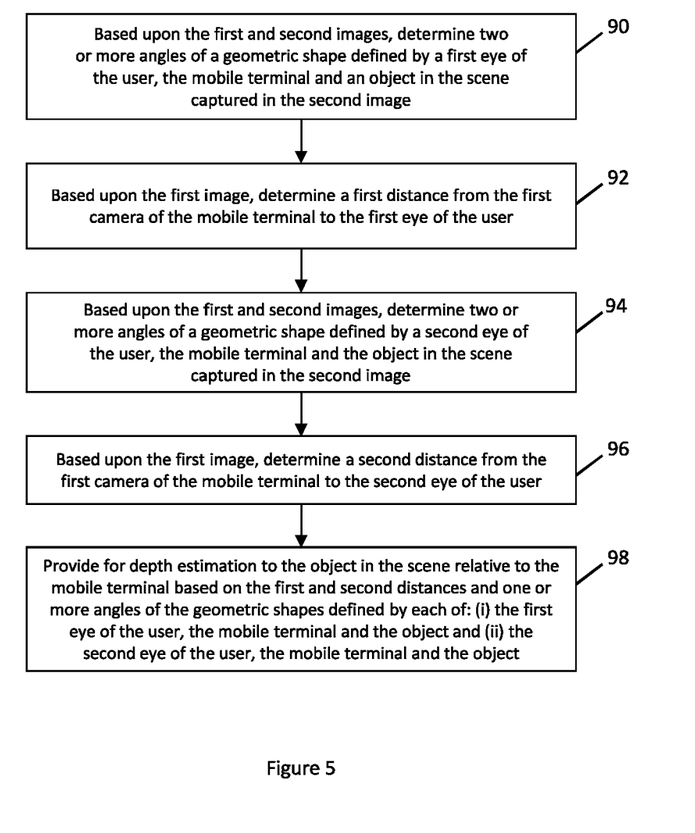
FIG. 5 is a flow chart illustrating operations performed, such as by the apparatus of FIG. 2, in accordance with an example embodiment of the present disclosure based upon images of each of the two eyes of the user.

As shown in FIG. 5 and as described above relative to FIG. 3 in more detail with respect to one eye of the user 10, the apparatus 30 of this example embodiment includes means, such as the processing circuitry 32, for determining, based upon the first and second images, two or more angles of a geometric shape defined by a first eye of the user, the mobile terminal 12 and an object in the scene captured in the second image. See block 90. Based upon the first image, the apparatus also includes means, such as the processing circuitry, for determining a first distance from the first camera of the mobile terminal to the first eye of the user. See block 92. Based upon the first and second images and as shown in block 94, the apparatus of this example embodiment includes means, such as the processing circuitry, for determining two or more angles of a geometric shape defined by a second eye of the user, the mobile terminal and the object in the scene captured in the second image. Based upon the first image, the apparatus of this example embodiment also includes means, such as the processing circuitry, for determining a second distance from the first camera of the mobile terminal to the second eye of the user. See block 96. In this example embodiment and as shown in block 98, the apparatus further includes means, such as the processing circuitry, for providing for depth estimation to the object in the scene relative to the mobile terminal based on the first and second distances and one or more angles of the geometric shapes defined by each of: (i) the first eye of the user, the mobile terminal and the object and (ii) the second eye of the user, the mobile terminal and the object.

The method, apparatus 30 and computer program product for estimating the depth of an object in a scene and creating a depth map may be utilized for a variety of applications. For example, the depth map may be utilized in conjunction with AR applications in order to define the location of one or more objects relative to a mobile terminal 12 carried by the user 10. Once the depth map has been created for the objects within the scene, the AR application may rely upon the depth map to position virtual objects relative the physical objects in the scene for which the depth map has been created. By way of example, a person considering the purchase of furniture for a room may be instructed to sequentially gaze at different objects in the room, such as each window in the room, the border of the room, the doorway to the room, etc., with the method, apparatus and computer program product of an example embodiment separately estimating the depth to each of these objects. Thereafter, in response to the selection of one or more pieces of furniture by the user, the AR application may be configured to position a virtual representation of the selected piece of furniture within an image of the room and relative to the various objects in the room as defined by the depth map, thereby permitting the user to virtually determine the appearance of the piece of furniture within the actual room.

Figure 6:
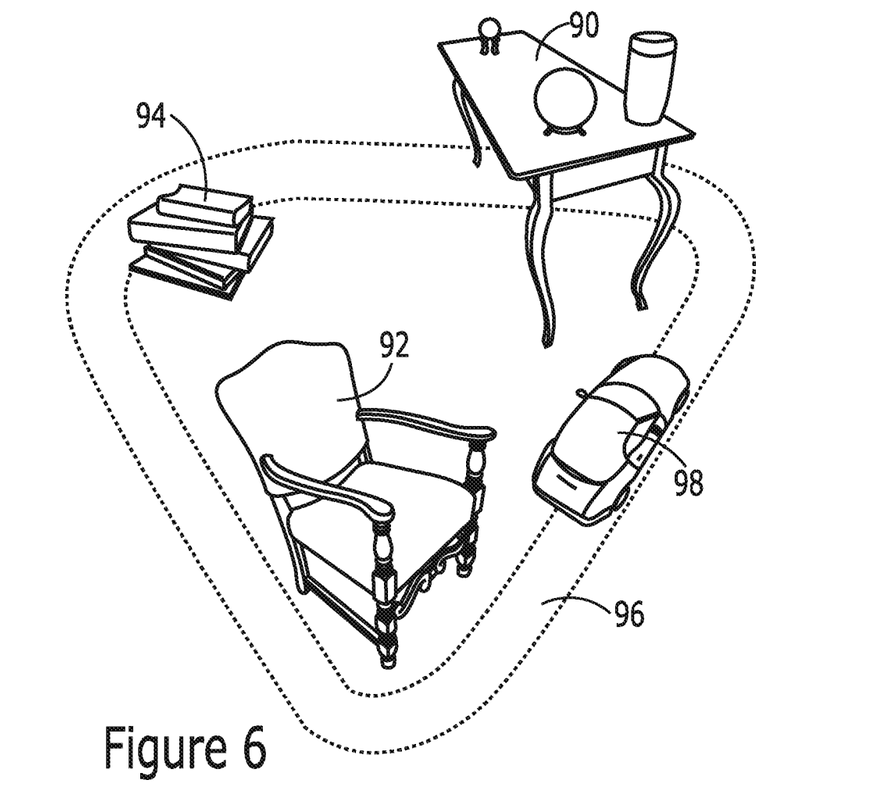
FIG. 6 is a perspective view of a scene as utilized in conjunction with an AR application in which a virtual race car is driven by a user about a course defined relative to the objects in the scene for which a depth map was created in accordance with an example embodiment of the present disclosure.

Alternatively, and as depicted in FIG. 6, the method, apparatus 30 and computer program product of another example embodiment may estimate the depth to a number of physical objects within a room, such as a table 90, a chair 92, a stack of books 94, etc., by sequentially instructing the user 10 to look at each of these objects, capturing first and second images while the user looks at each object and then estimating the depth to the object at which the user gazes pursuant to the process described above in FIG. 3 The AR application may be configured, in turn, to utilize the objects within the room and the depth map of those objects to define a virtual race course about which the user drives a virtual race car. As shown in FIG. 6, the virtual race track 96 extends around the stack of books, under the table and around the chair and the user then endeavors to direct a race car 98 about the virtual race track defined by the various objects within the room.

As described above, a method, apparatus 30 and computer program product provide for the depth estimation to objects within a scene that is captured by first and second cameras 16, 18 of a mobile terminal 12. By utilizing images captured by first and second cameras of a mobile terminal to estimate the depth of one or more objects within a scene, the depth of respective objects within the scene can be estimated in an efficient manner without reliance upon a dedicated depth sensor, e.g., a LIDAR sensor. Based upon the estimated depth of objects within the scene and the resulting depth map, various applications, including AR applications such as those described above by way of example but not of limitation, can facilitate user interaction, such as virtual interaction, with the objects within the scene.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 34, of an apparatus, e.g., 30, employing an embodiment of the present disclosure and executed by processing circuitry, e.g., 32, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above can be modified or further amplified. Furthermore, in some embodiments, additional optional operations can be included. Modifications, additions, subtractions, inversions, correlations, proportional relationships, disproportional relationships, attenuation and/or amplifications to the operations above can be performed in any order and in any combination.

Many modifications and other embodiments of the present disclosure will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

The invention claimed is:

1. A method comprising:
   based upon an image comprising an eye of a user captured by a first camera of a mobile terminal and an image of a scene captured by a second camera of the mobile terminal, determining two or more angles of a geometric shape defined by the eye of the user, the mobile terminal and an object of the scene;
   based upon the image comprising the eye of the user captured by the first camera of the mobile terminal, determining a first distance from the first camera of the mobile terminal to the eye of the user; and
   based upon the first distance and one or more angles of the geometric shape defined by the eye of the user, the mobile terminal and the object of the scene, providing for depth estimation to the object in the scene relative to the mobile terminal.

2. The method according to claim 1, wherein determining two or more angles of the geometric shape comprises:
   based upon the image comprising the eye of the user captured by the first camera of the mobile terminal, determining a first angle between a gaze direction of the eye of the user and a path between the mobile terminal and the eye of the user;
   based upon the image of the scene captured by the second camera of the mobile terminal and the image comprising the eye of the user captured by the first camera of the mobile terminal, determining a second angle between a path between the mobile terminal and the object in the scene and the path between the mobile terminal and the eye of the user; and
   determining a third angle between the path between the mobile terminal and the object in the scene and a path between the eye of the user and the object in the scene.

3. The method according to claim 2, wherein providing for depth estimation comprises, based upon the first distance, the first angle and the third angle, providing for depth estimation of the object in the scene relative to the mobile terminal.

4. The method according to claim 1, further comprising causing an instruction to be provided to the user to gaze at the object in the scene prior to the image comprising the eye of the user being captured by the first camera of the mobile terminal.

5. The method according to claim 1, further comprising receiving information identifying the object in the scene to which a gaze of the user is directed.

6. The method according to claim 1, further comprising creating a depth map of at least a portion of the scene based at least partially upon the depth estimation of the object in the scene relative to the mobile terminal.

7. The method according to claim 1, further comprising:
   based upon an image comprising a second eye of the user captured by the first camera of the mobile terminal and the image of the scene captured by the second camera of the mobile terminal, determining two or more angles of a geometric shape defined by the second eye of the user, the mobile terminal and the object of the scene; and
   based upon the image comprising the second eye of a user captured by the first camera of the mobile terminal, determining a second distance from the first camera of the mobile terminal to the second eye of the user,
   wherein providing for depth estimation comprises providing for depth estimation to the object in the scene relative to the mobile terminal also based upon the second distance and one or more angles of the geometric shape defined by the second eye of the user, the mobile terminal and the object of the scene.

8. The method according to claim 1, further comprising:
   receiving information regarding a change in position of the mobile terminal relative to a position of the mobile terminal at a time at which the image comprising the eye of the user was captured by the first camera of the mobile terminal and at a time at which the image of the scene was captured by the second camera of the mobile terminal; and modifying the depth estimation based upon the change in position of the mobile terminal.

9. An apparatus comprising:
at least one processor; and
at least one memory including computer program code, the at least one memory storing instructions that, when executed by the at least one processor, cause the apparatus at least to:
based upon an image comprising an eye of a user captured by a first camera of a mobile terminal and an image of a scene captured by a second camera of the mobile terminal, determine two or more angles of a geometric shape defined by the eye of the user, the mobile terminal and an object of the scene;
based upon the image comprising the eye of the user captured by the first camera of the mobile terminal, determine a first distance from the first camera of the mobile terminal to the eye of the user; and
based upon the first distance and one or more angles of the geometric shape defined by the eye of the user, the mobile terminal and the object of the scene, provide for depth estimation to the object in the scene relative to the mobile terminal.

10. The apparatus according to claim 9, wherein determining two or more angles of the geometric shape comprises:
based upon the image comprising the eye of the user captured by the first camera of the mobile terminal, determining a first angle between a gaze direction of the eye of the user and a path between the mobile terminal and the eye of the user;
based upon the image of the scene captured by the second camera of the mobile terminal and the image comprising the eye of the user captured by the first camera of the mobile terminal, determining a second angle between a path between the mobile terminal and the object in the scene and the path between the mobile terminal and the eye of the user; and
determining a third angle between the path between the mobile terminal and the object in the scene and a path between the eye of the user and the object in the scene.

11. The apparatus according to claim 10, wherein providing for depth estimation comprises, based upon the first distance, the first angle and the third angle, providing for depth estimation of the object in the scene relative to the mobile terminal.

12. The apparatus according to claim 9, wherein the at least one memory and the instructions stored therein are configured to, with the at least one processor, further cause the apparatus to: provide an instruction to the user to gaze at the object in the scene prior to the image comprising the eye of the user being captured by the first camera of the mobile terminal.

13. The apparatus according to claim 9, wherein the at least one memory and the instructions stored therein are configured to, with the at least one processor, further cause the apparatus to: receive information identifying the object in the scene to which a gaze of the user is directed.

14. The apparatus according to claim 9, wherein the at least one memory and the instructions stored therein are configured to, with the at least one processor, further cause the apparatus to: create a depth map of at least a portion of the scene based at least partially upon the depth estimation of the object in the scene relative to the mobile terminal.

15. The apparatus according to claim 9, wherein the at least one memory and the instructions stored therein are configured to, with the at least one processor, further cause the apparatus to:
based upon an image comprising a second eye of the user captured by the first camera of the mobile terminal and the image of the scene captured by the second camera of the mobile terminal, determine two or more angles of a geometric shape defined by the second eye of the user, the mobile terminal and the object of the scene; and
based upon the image comprising the second eye of a user captured by the first camera of the mobile terminal, determine a second distance from the first camera of the mobile terminal to the second eye of the user,
wherein providing for depth estimation comprises providing for depth estimation to the object in the scene relative to the mobile terminal also based upon the second distance and one or more angles of the geometric shape defined by the second eye of the user, the mobile terminal and the object of the scene.

16. The apparatus according to claim 9, wherein the at least one memory and the instructions stored therein are configured to, with the at least one processor, further cause the apparatus to:
receive information regarding a change in position of the mobile terminal relative to a position of the mobile terminal at a time at which the image comprising the eye of the user was captured by the first camera of the mobile terminal and the image of the scene was captured by the second camera of the mobile terminal; and
based upon the change in position of the mobile terminal, modify the depth estimation.

17. The apparatus according to claim 9, wherein the first and second cameras have fields of view on opposite sides of the mobile terminal.

18. A non-transitory computer readable medium comprising program instructions stored thereon, the program instructions configured to cause at least the following:
based upon an image comprising an eye of a user captured by a first camera of a mobile terminal and an image of a scene captured by a second camera of the mobile terminal, determine two or more angles of a geometric shape defined by the eye of the user, the mobile terminal and an object of the scene;
based upon the image comprising the eye of the user captured by the first camera of the mobile terminal, determine a first distance from the first camera of the mobile terminal to the eye of the user; and
based upon the first distance and one or more angles of the geometric shape defined by the eye of the user, the mobile terminal and the object of the scene, provide for depth estimation to the object in the scene relative to the mobile terminal.

19. The non-transitory computer readable medium according to claim 18, wherein the program instructions configured to determine two or more angles of the geometric shape comprise program instructions configured to:
based upon the image comprising the eye of the user captured by the first camera of the mobile terminal, determine a first angle between a gaze direction of the eye of the user and a path between the mobile terminal and the eye of the user;
based upon the image of the scene captured by the second camera of the mobile terminal and the image comprising the eye of the user captured by the first camera of the mobile terminal, determine a second angle between a path between the mobile terminal and the object in the scene and the path between the mobile terminal and the eye of the user; and determine a third angle between the path between the mobile terminal and the object in the scene and a path between the eye of the user and the object in the scene.

20. The non-transitory computer readable medium according to claim 19, wherein the program instructions configured to provide for depth estimation comprise program instructions configured to, based upon the first distance, the first angle and the third angle, provide for depth estimation of the object in the scene relative to the mobile terminal.

* * * * *